United States Patent
Cendrowicz

(10) Patent No.: US 10,753,685 B2
(45) Date of Patent: Aug. 25, 2020

(54) FIRING PROCESS AND METHOD

(71) Applicant: ROLLS-ROYCE plc, London (GB)

(72) Inventor: Aleksander Maria Cendrowicz, Derby (GB)

(73) Assignee: ROLLS-ROYCE PLC, London (GB)

( * ) Notice: Subject to any disclaimer, the term of this patent is extended or adjusted under 35 U.S.C. 154(b) by 1219 days.

(21) Appl. No.: 15/053,378

(22) Filed: Feb. 25, 2016

(65) Prior Publication Data
US 2016/0258686 A1 Sep. 8, 2016

(30) Foreign Application Priority Data

Mar. 6, 2015 (GB) .................................. 1503785.6

(51) Int. Cl.
| | |
|---|---|
| B29C 45/00 | (2006.01) |
| F27D 5/00 | (2006.01) |
| B28B 11/24 | (2006.01) |
| C04B 35/64 | (2006.01) |
| B22C 7/02 | (2006.01) |

(52) U.S. Cl.
CPC .............. *F27D 5/0012* (2013.01); *B22C 7/02* (2013.01); *B28B 11/243* (2013.01); *C04B 35/64* (2013.01); *F27D 5/0006* (2013.01)

(58) Field of Classification Search
CPC ....... H01L 21/56; H01L 21/565; B29C 45/14; B29C 45/72; B29C 45/0001; B29C 45/14008; B29C 45/14065; B22C 7/02; B22C 13/00; B28B 11/24; B28B 11/243
See application file for complete search history.

(56) References Cited

U.S. PATENT DOCUMENTS

| | | | | |
|---|---|---|---|---|
| 5,314,646 A | * | 5/1994 | Strobel | .................... B28B 3/00 264/13 |
| 6,900,126 B2 | * | 5/2005 | Carter | .................... B82Y 10/00 257/E21.582 |
| 9,206,309 B2 | * | 12/2015 | Appleby | .................. B22C 9/04 |
| 2002/0017732 A1 | | 2/2002 | Koyama et al. | |
| 2010/0289181 A1 | | 11/2010 | Tsutsui | |

(Continued)

FOREIGN PATENT DOCUMENTS

| | | |
|---|---|---|
| EP | 1710063 A2 | 10/2006 |
| JP | 2014-080355 A | 5/2014 |
| JP | 2014080355 A * | 5/2014 |

OTHER PUBLICATIONS

Oct. 19, 2016 Search Report issued in European Patent Application No. 16157159.

(Continued)

*Primary Examiner* — Gregory A Wilson
(74) *Attorney, Agent, or Firm* — Oliff PLC

(57) ABSTRACT

The present invention provides a method and apparatus for firing a ceramic component e.g. a ceramic core, within a firing receptacle containing firing powder. The method comprises using a shaping element to shape and/or define an upper surface of a first portion of firing powder at a predetermined height within the firing receptacle. The ceramic component is subsequently placed on the upper surface of the first portion of firing powder e.g. within a depression formed using the shaping element and covered with a second portion of firing powder. The shaping element may comprise a gridded/meshed plate.

14 Claims, 3 Drawing Sheets

(56) References Cited

U.S. PATENT DOCUMENTS

2011/0132562 A1* 6/2011 Merrill .................... B22C 9/02
 164/9
2017/0072608 A1* 3/2017 Hwang ............. B29C 45/14508

OTHER PUBLICATIONS

Jun. 23, 2015 Search Report issued in British Patent Application No. 1503785.6.

* cited by examiner

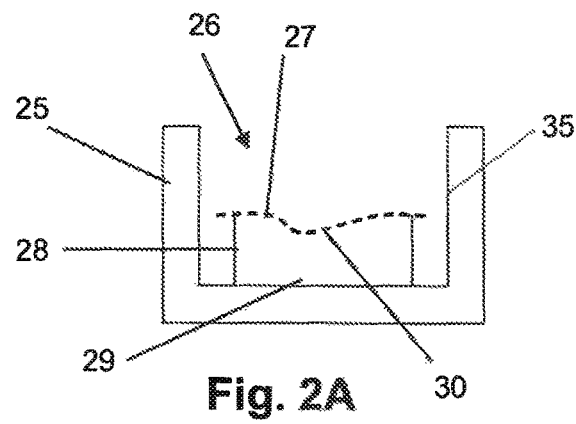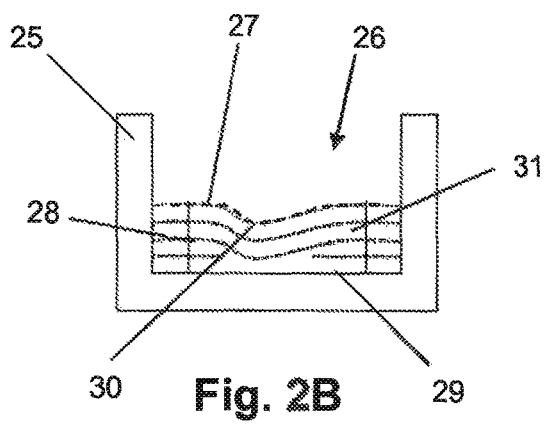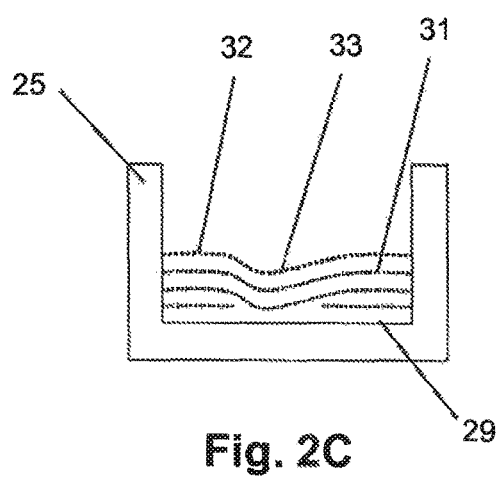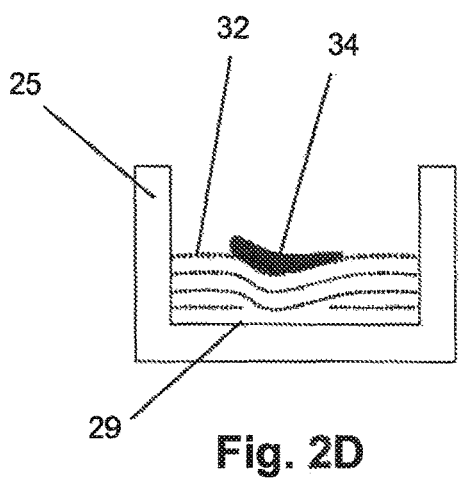

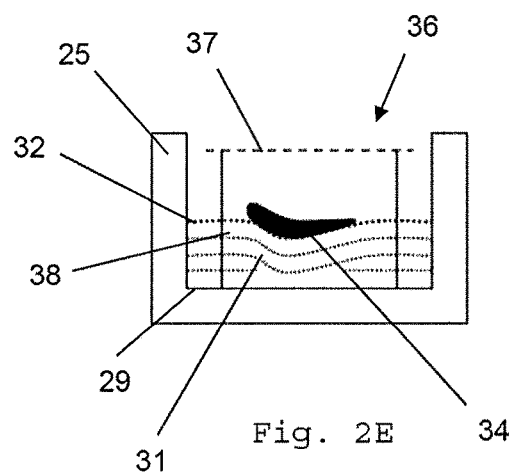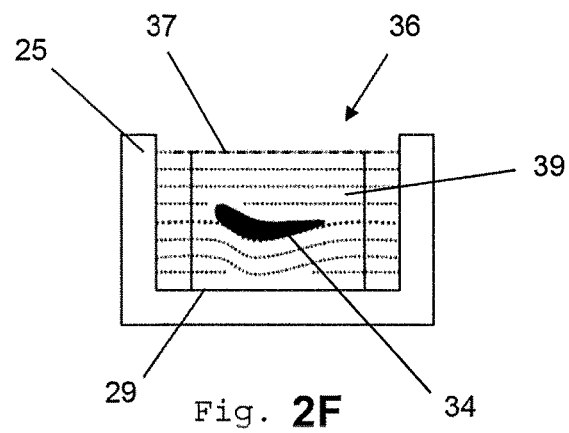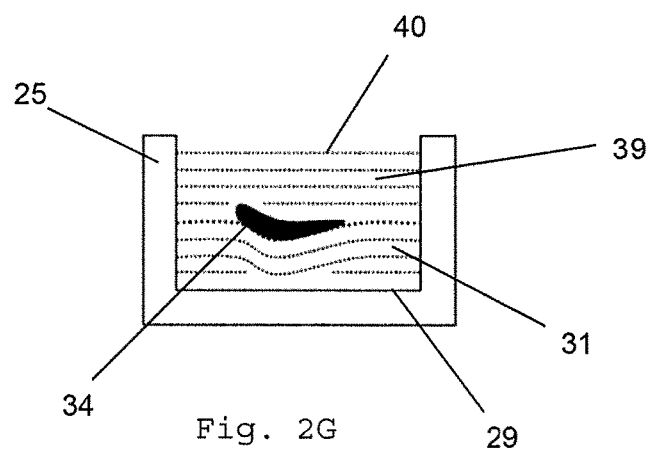

FIRING PROCESS AND METHOD

FIELD OF THE INVENTION

The present invention relates to a method and apparatus for firing a ceramic component within a firing receptacle containing firing powder. In particular, although not exclusively, the present invention relates to a method and apparatus for firing a ceramic core for use in the investment casting process.

BACKGROUND OF THE INVENTION

The investment casting process is used to create metal components, e.g. turbine blades, by pouring molten metal into a ceramic shell of the desired final shape and subsequently removing the ceramic.

The process is an evolution of the lost-wax process whereby a component of the size and shape required in metal is manufactured using a wax pattern die into which molten wax is injected. The wax pattern is then dipped in ceramic slurry to create a ceramic shell on the wax pattern. The wax is removed and the shell fired to harden it. The resulting ceramic shell has an open cavity of the size and shape of the final component into which the metal can be poured. The ceramic shell is subsequently removed, either physically or chemically.

In order to make a component e.g. an aerofoil blade, with internal cavities e.g. internal cooling channels, a ceramic core is required. This is manufactured separately and is placed inside the wax pattern die prior to wax injection.

After casting the metal in the ceramic shell, the ceramic core is removed e.g. leached with alkaline solution to leave the hollow metal component.

Ceramic cores are manufactured using a ceramic injection moulding process (CIM). A ceramic material, usually silica, is suspended in an organic, polymeric binder to create a feedstock. This feedstock is then injected into a die cavity of the required size and shape to create a "green" component comprised of the ceramic and binder components. The binder is subsequently thermally or chemically removed and the ceramic consolidated by sintering/firing at elevated temperatures; this gives the final ceramic core.

The core is usually supported during the firing process by placing it within a ceramic receptacle and surrounding it with an inert firing powder. This has the advantage of promoting controlled binder removal by wicking during the early stages of firing. The current method involves the steps of manually adding an amount of firing powder into a ceramic receptacle, placing one or more ceramic cores into the firing powder and manually adding further firing powder to cover the top of the core(s).

The homogeneity of the firing powder, the position of the core within the receptacle and the orientation of the core within the receptacle have all been shown to affect the dimensions of the final fired ceramic core and thus the dimensions of the cavity/channel within the final metal component.

Accordingly, there is a need for a method and an apparatus with which accurate and repeatable dimensions can be obtained for a ceramic core.

SUMMARY OF THE INVENTION

The present invention provides a method and apparatus for firing a ceramic component which a firing receptacle containing firing powder.

The method of firing a ceramic component within a firing receptacle containing firing powder, may comprise: using a shaping element to shape and/or define an upper surface of a first portion of firing powder at a predetermined height within the firing receptacle prior to placing the ceramic component on the upper surface of the first portion of firing powder.

The apparatus for firing a ceramic component within a firing receptacle containing firing powder, may comprise: a shaping element, the shaping element being insertable into the firing receptacle, such that, in use, it shapes and/or defines an upper surface of a first portion of firing power at a predetermined height within the firing receptacle prior to placing the ceramic component on the upper surface of the first portion of firing powder.

By providing a shaping element for shaping/defining the upper surface of the first portion of firing powder at a predetermined height within the firing receptacle, the positioning of the ceramic component within the firing receptacle (i.e. spacing from the base of the firing receptacle) can be reliably and repeatably controlled to eliminate/ameliorate dimensional variations in the fired ceramic component.

Optional features of the invention will now be set out. These are applicable singly or in any combination with any aspect of the invention.

The apparatus may comprise at least one (preferably a plurality) of supports for supporting the shaping element above and spaced from the base of the firing receptacle by the predetermined height. In these embodiments, the method may comprise positioning the shaping element within the firing receptacle with the shaping element being supported above the base of the firing receptacle at the predetermined height.

The or each support may be a strut depending from the shaping element, the base of the or each strut resting on the base of the firing receptacle during use to shape the upper surface of the first portion of firing powder. The length of the or each strut will typically equal the predetermined height. Alternatively, the or each support may be a hook, the hook(s) for engaging the upper rim of the firing receptacle during use such that, in use, the shaping element is suspended within the firing receptacle at the predetermined height.

The shaping element may comprise at least one handle portion. The method may further comprise removing the shaping element (e.g. using the at least one handle) prior to positioning the ceramic component on the upper surface of the first portion of firing powder.

The method further comprises covering the ceramic component with a second portion of firing powder.

The apparatus may further comprise a levelling element, the levelling element being insertable into the firing receptacle, such that, in use, it shapes and/or defines an upper surface of the second portion of firing powder at a second predetermined height within the firing receptacle, the second portion of firing powder covering the ceramic component. The method may further comprises using the levelling element to shape and/or the upper surface of the second portion of firing powder at a second predetermined height within the firing receptacle, the second portion of firing powder covering the ceramic component. The levelling element helps ensure that the amount of firing powder covering the ceramic component can be reliably and repeatably controlled to eliminate/ameliorate dimensional variations in the fired ceramic component.

The apparatus may comprise at least one (preferably a plurality) of supports for supporting the levelling element above and spaced from the base of the firing receptacle by the second predetermined height (which will, of course, be greater than the predetermined height at which the shaping element shapes/defines the upper surface of the first portion). In these embodiments, the method may comprise positioning the levelling element within the firing receptacle with the levelling element being supported above the base of the firing receptacle at the second predetermined height.

The or each support may be a strut depending from the levelling element, the base of the or each strut resting on the base of the firing receptacle during use to shape the upper surface of the second portion of firing powder. The length of the or each strut typically equals the second predetermined height. Alternatively, the or each support may be a hook, the hook(s) for engaging the upper rim of the firing receptacle during use such that, in use, the levelling element is suspended within the firing receptacle at the second predetermined height.

The levelling element may comprise at least one handle portion. The method may further comprise removing the levelling element (e.g. using the at least one handle portion) prior to firing the ceramic component.

The shaping element and/or levelling element may be formed of metal e.g. stainless steel or a ceramic material. In this case, the shaping/levelling element(s) may be re-useable. In some embodiments, the shaping element and/or levelling element is formed of an organic material. In this case, the shaping/levelling element(s) may be retained in the firing receptacle during firing during which it/they will combust.

The shaping element and/or the levelling element may be a plate. The plates may comprise apertures. For example, in some embodiments, the shaping element and/or the levelling element may be a respective meshed/gridded plate.

The meshed/gridded shaping plate may be positioned in the firing receptacle prior to the addition of the first portion of firing powder into the firing receptacle. The first portion of firing powder is then added such that its upper surface abuts the shaping element.

The meshed/gridded levelling plate may be positioned in the firing receptacle prior to the addition of the second portion of firing powder into the firing receptacle. The second portion of firing powder is then added such that its upper surface abuts the levelling element.

The method may further comprise scraping (e.g. with a scraping tool) an upper surface (distal the base of the firing receptacle in use) of the meshed/gridded shaping plate and/or levelling plate to shape and define the upper surface of first and/or second portions of firing powder respectively.

The shaping element/plate may comprise a protrusion on its lower surface (proximal the base of the firing receptacle in use) or its lower surface is convex, which, in use, forms an indentation/imprint in the upper surface of the first portion of firing powder. The method may further comprise positioning the ceramic component on the indentation/imprint. The shaping element/plate may be contoured such that the lower surface defines a protrusion matching the shape of at least a portion of the ceramic component.

The shaping element/plate may follow a surface profile which forms a corresponding surface profile within the first portion of ceramic powder on which the ceramic component is positioned in order to provide a greater level of support to certain positions of the ceramic component and lesser levels of support to other positions of the ceramic component with the aim of correcting the distortion to the ceramic component that occurs during the firing process. As a way of illustrating this with an example, the shaping element/plate may comprise a protrusion on its upper surface or its upper surface may be convex, which, in use forms a protrusion or mound in the upper surface of the first portion of firing powder. In this embodiment, the method further comprises positioning the ceramic component on the protrusion or mound. This is useful for firing ceramic components which have a tendency to sag in a central portion during firing.

In some embodiments, the levelling element/plate has a planar lower surface which may be parallel to the base of the firing receptacle.

In some embodiments, the method further comprises agitating, e.g. shaking, the firing receptacle after addition of the first and/or second portion(s) of firing powder to homogenise the firing powder.

The ceramic component may be a ceramic core e.g. a ceramic core manufactured using a ceramic injection moulding process (CIM). The ceramic core may be for inserting into a die for forming cavities/channels in a cast metal article e.g. an aerofoil blade.

A cast article e.g. an aerofoil blade having a cavity or channel may be formed using a ceramic core made using the method/apparatus described herein.

BRIEF DESCRIPTION OF THE DRAWINGS

Embodiments of the invention will now be described by way of example with reference to the accompanying drawings in which:

FIGS. 2A-2G show various steps in a method and an apparatus according to an embodiment of the present invention.

DETAILED DESCRIPTION AND FURTHER OPTIONAL FEATURES OF THE INVENTION

Figure 1:
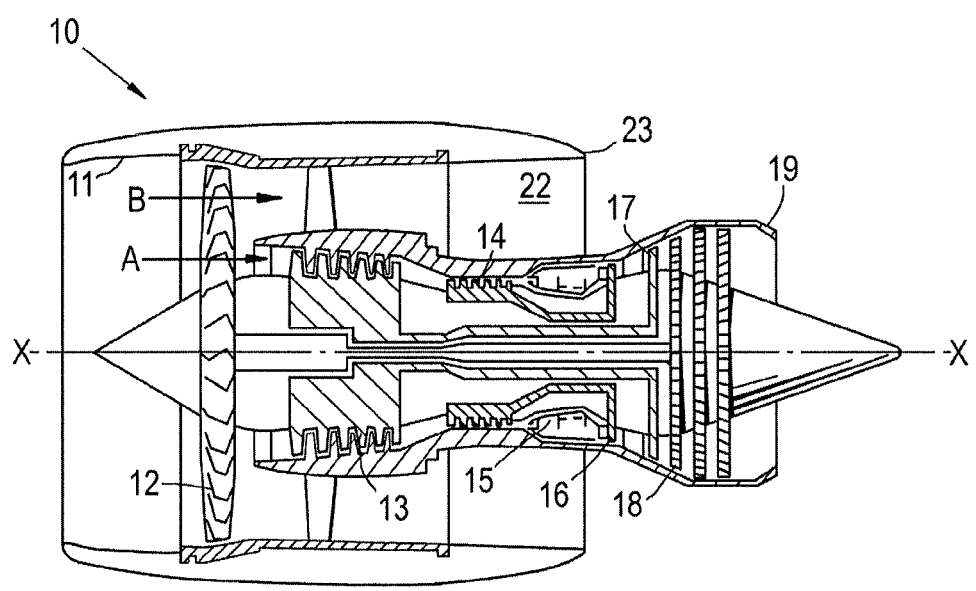
FIG. 1 shows a ducted fan having a series of turbines each having a plurality of aerofoil blades formed using a method according to an embodiment of the present invention.

With reference to FIG. 1, a ducted fan gas turbine engine incorporating a series of turbines each having a plurality of aerofoil blades formed using a method according to an embodiment of the present invention is generally indicated at 10 and has a principal and rotational axis X-X. The engine comprises, in axial flow series, an air intake 11, the propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

FIGS. 2A-2G show an apparatus and method for firing a ceramic component according an embodiment of the invention.

FIG. 2A shows a firing receptacle 25 and a shaping element 26.

The shaping element 26 comprises a meshed/gridded shaping plate 27 which is supported on two support struts 28 depending from the lower surface of the shaping plate 27.

The shaping plate 27 is positioned within the empty firing receptacle 25 with the ends of the struts 28 resting on the base 29 of the firing receptacle 25.

The shaping plate 27 is supported by the support struts 28 within the firing receptacle at a predetermined height above the base 29 of the firing receptacle 25.

The shaping plate 27 is contoured to define a protrusion 30 on its lower surface (the lower surface is the surface proximal the base of the firing receptacle).

As shown in FIG. 2B, a first portion of firing powder 31 is added to the firing receptacle until it abuts the lower surface of the shaping plate 27. In other embodiments (not shown), the shaping element may be positioned within a firing receptacle already containing a first portion of firing powder and the upper surface of the first portion of firing powder shaped by pressing the shaping element into the first portion of firing powder.

The firing receptacle 25 is agitated to homogenise the first portion of firing powder 31 within the firing receptacle.

The upper surface of the shaping plate (distal the base of the firing receptacle), is scraped to ensure the upper surface of the first portion of firing powder is flush with the shaping plate 27.

As shown in FIG. 2C, the shaping plate 27 is removed from the firing receptacle 25 to leave an upper surface 32 of the first portion of firing powder 31 at the predetermined height defined by the shaping plate 27 and having a surface shape matching the contour of the shaping plate 27 i.e. with an indentation 33 matching the shape of the protrusion 30 on the lower surface of the shaping plate 27.

As shown in FIG. 2D, a ceramic component 34 is positioned within the indentation 33 on the upper surface 32 of the first portion of firing powder 31. Accordingly, the position of the ceramic component 34 i.e. the spacing from the base 29 of the firing receptacle 25 and from the rim 35 of the firing receptacle 25 can be reliably and repeatedly controlled.

Next, as shown in FIG. 2E, a levelling element 36 is positioned within the firing receptacle 25.

The levelling element 36 comprises a meshed/gridded shaping plate 37 which is supported on two support struts 38 depending from the lower surface of the levelling plate 37.

The levelling plate 37 is positioned within the firing receptacle 25 with the ends of the struts resting on the base 29 of the firing receptacle 25.

The levelling plate 37 is supported by the support struts 38 within the firing receptacle at a second predetermined height above the base 29 of the firing receptacle 25.

The levelling plate 37 is planar and sits parallel to the base 29 of the firing receptacle. In other embodiments (not shown), the levelling element/plate may have a contoured lower surface.

As shown in FIG. 2F, a second portion of firing powder 39 is added to the firing receptacle 25 until it abuts the lower surface of the levelling plate 37.

The firing receptacle 25 is agitated to homogenise the second portion of firing powder 39.

The upper surface of the levelling plate (distal the base of the firing receptacle), is scraped to ensure the upper surface of the second portion of firing powder 39 is flush with the shaping plate 27.

Next, as shown in FIG. 2G, the levelling plate 37 is removed from the firing receptacle 25 to leave an upper surface 40 of the second portion of firing powder 39 at athe second predetermined height defined by the levelling plate 37 and having a planar surface matching the lower surface of the levelling plate 37. Accordingly, the amount of firing powder covering the ceramic component 34 can be reliably and repeatably controlled to eliminate/ameliorate dimensional variations in the fired ceramic component.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of firing a ceramic component within a firing receptacle containing firing powder, the method comprising:

using a shaping element to shape and/or define an upper surface of a first portion of firing powder at a first predetermined height within the firing receptacle prior to placing the ceramic component on the upper surface of the first portion of firing powder;

using a levelling element to shape and/or define an upper surface of the second portion of firing powder at a second predetermined height within the firing receptacle, the second portion of firing powder covering the ceramic component; and positioning the levelling element within the firing receptacle with the levelling element being supported above a base of the firing receptacle at the second predetermined height using at least one support, wherein the or each support of the levelling element is a strut depending from the levelling element, such that, in use, the base of the or each strut rests on the base of the firing receptacle or wherein the or each support of the levelling element is a hook such that, in use, the hook(s) rest on a rim of the firing receptacle to suspend the levelling element within the firing receptacle, and the shaping element and/or the levelling element is a respective meshed/gridded plate.

2. A method according to claim 1 further comprising positioning the shaping element within the firing receptacle with the shaping element being supported above the base of the firing receptacle at the first predetermined height.

3. A method according to claim 2 further comprising adding the first portion of firing powder such that it abuts the shaping element.

4. A method according to claim 1 wherein the method further comprises removing the shaping element prior to positioning the ceramic component on the upper surface of the first portion of firing powder.

5. A method according to claim 1 wherein the shaping element comprises a protrusion on its lower or upper surface and the method further comprises forming an indentation or protrusion in the upper surface of the first portion of firing powder using the protrusion and positioning the ceramic component in the indentation or on the protrusion.

6. A method according to claim 1 further comprising covering the ceramic component with a second portion of firing powder.

7. A method according to claim 1 wherein the levelling element is the meshed/gridded element and the method comprises adding the second portion of firing powder such that it abuts the levelling element.

8. A method according to claim 7 wherein the method further comprises removing the levelling element prior to firing the ceramic component.

9. A method according to claim 1 further comprising agitating the firing receptacle after addition of the first and/or second portion(s) of firing powder.

10. An apparatus for firing a ceramic component within a firing receptacle containing firing powder, the apparatus comprising:
- a shaping element, the shaping element being insertable into the firing receptacle, such that, in use, it shapes an upper surface of a first portion of firing powder at a first predetermined height within the firing receptacle prior to placing the ceramic component on the upper surface of the first portion of firing powder;
- a levelling element, the levelling element being insertable into the firing receptacle, such that, in use, it shapes an upper surface of a second portion of firing powder at a second predetermined height within the firing receptacle, the second portion of firing powder covering the ceramic component; and
- at least one support for supporting the levelling element spaced from a base of the firing receptacle by the second predetermined height,
- wherein the or each support of the levelling element is a strut depending from the levelling element, such that, in use, the base of the or each strut rests on the base of the firing receptacle or wherein the or each support of the levelling element is a hook such that, in use, the hook(s) rest on a rim of the firing receptacle to suspend the levelling element within the firing receptacle, and
- the shaping element and/or the levelling element is a respective meshed/gridded plate.

11. Apparatus according to claim 10 further comprising at least one support for supporting the shaping element spaced from the base of the firing receptacle by the first predetermined height.

12. Apparatus according to claim 11 wherein the or each support of the the shaping element is a strut depending from the shaping element, such that, in use, the base of the or each strut rests on the base of the firing receptacle or wherein the or each support of the shaping element is a hook such that, in use, the hook(s) rest on a rim of the firing receptacle to suspend the shaping element within the firing receptacle.

13. Apparatus according to claim 10 wherein the shaping element comprises a protrusion on its lower or upper surface which, in use, forms an indentation/imprint or protrusion in the upper surface of the first portion of firing powder.

14. Apparatus according to claim 13 wherein the lower or upper surface of the shaping element is convex.

* * * * *